US008719070B2

(12) United States Patent
Jabbour et al.

(10) Patent No.: US 8,719,070 B2
(45) Date of Patent: May 6, 2014

(54) METHOD AND SYSTEM FOR CONFERENCE ROOM SCHEDULING

(75) Inventors: Fadi R. Jabbour, Sunnyvale, CA (US); Eric H. Lee, San Jose, CA (US); David C. Lee, Sunnyvale, CA (US); Johnny H. Lee, San Gabriel, CA (US)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 13/245,523

(22) Filed: Sep. 26, 2011

(65) Prior Publication Data
US 2012/0016700 A1 Jan. 19, 2012

Related U.S. Application Data

(62) Division of application No. 11/619,455, filed on Jan. 3, 2007, now abandoned.

(51) Int. Cl.
*G06Q 10/00* (2012.01)
*G06Q 10/06* (2012.01)
(52) U.S. Cl.
CPC .... *G06Q 10/06312* (2013.01); *G06Q 10/06314* (2013.01)
USPC ........................................ 705/7.22; 705/7.25
(58) Field of Classification Search
CPC .................. G06Q 10/06312; G06Q 10/06314
USPC .............................................. 705/7.22, 7.25
See application file for complete search history.

(56) References Cited

U.S. PATENT DOCUMENTS

| 5,483,587 | A | 1/1996 | Hogan et al. | 379/202 |
|---|---|---|---|---|
| 5,546,449 | A | 8/1996 | Hogan et al. | 379/202 |
| 5,903,637 | A | 5/1999 | Hogan et al. | 379/203 |
| 6,282,278 | B1 | 8/2001 | Doganata et al. | 379/202 |
| 6,324,169 | B1 | 11/2001 | Roy | 370/260 |
| 7,492,729 | B2 | 2/2009 | Shaffer et al. | 370/260 |
| 2002/0069125 | A1* | 6/2002 | Bruck et al. | 705/26 |
| 2002/0184063 | A1 | 12/2002 | Kaufman et al. | 705/7 |
| 2003/0154160 | A1* | 8/2003 | Arndt | 705/37 |
| 2005/0071213 | A1* | 3/2005 | Kumhyr et al. | 705/8 |
| 2005/0190053 | A1* | 9/2005 | Dione | 340/500 |
| 2005/0273372 | A1 | 12/2005 | Bowne et al. | 705/5 |
| 2006/0015376 | A1* | 1/2006 | Sattler et al. | 705/5 |
| 2006/0171337 | A1 | 8/2006 | Shaffer et al. | 370/261 |
| 2006/0218027 | A1 | 9/2006 | Carrion | 705/8 |
| 2007/0162315 | A1* | 7/2007 | Hodges | 705/8 |

OTHER PUBLICATIONS

Cisco Systems, Inc., "*Cisco Conference Connection*", Data Sheet, Internet Publication, http://www.cisco.com/warp/public/cc/pd/unco/cvco/prodlit/confr_ds.pdf, 7 pages, Jun. 2003.
Latitude Communications, "*Meetingplace Web 4.0, Secure, cost-effective web conferencing for enterprises*", © 2003 Latitude Communications, Inc., Internet Publication, http://www.latitude.com/pdfs/Web4.0.pdf, 2 pages, 2003.

(Continued)

*Primary Examiner* — Kevin Flynn
(74) *Attorney, Agent, or Firm* — Baker Botts L.L.P.

(57) ABSTRACT

A method for conference room scheduling includes detecting a user in a first location, obtaining reservation information associated with the first location, determining based on the reservation information whether the first location is reserved and notifying the user whether the first location is reserved.

18 Claims, 2 Drawing Sheets

(56) References Cited

OTHER PUBLICATIONS

U.S. Appl. No. 10/754,963, filed Jan. 8, 2004, entitled "*Method and System for Managing Conference Resources*", 43 pages specification, claims and abstract, 2 pages of drawings, inventors Shmuel (nmi) Shaffer et al, Jan. 8, 2004.

Notification of Transmittal of the International Search Report and the Written Opinion of the International Searching Authority or the Declaration; PCT/US07/88257; ISA/US; 8 pages, Apr. 2, 2008.

\* cited by examiner

METHOD AND SYSTEM FOR CONFERENCE ROOM SCHEDULING

CROSS REFERENCE TO RELATED APPLICATIONS:

This application is a divisional of U.S. application Ser. No. 11/619,455, filed Jan. 3, 2007, by Fadi R. Jabbour et al. and entitled "Method and System for Conference Room Scheduling".

TECHNICAL FIELD OF THE INVENTION

The present invention relates generally to communication systems and, more particularly, to a method and system for conference room scheduling.

BACKGROUND

Typically, organizations utilize computer networks in the reservation of conference rooms, for example, in a building of the organization. Users may reserve or "book" a conference room through software executed on the organization's computer network. Such reservation will indicate to others that the conference room is reserved for the reserved time. Oftentimes users do not book a conference room before using it. This may occur when two or more people decide to have an ad hoc meeting. One person may drop by another person's cubicle or office and ask whether the other person has time for a quick meeting. Instead of reserving a conference room, the two may walk to the nearest available room and begin to discuss the matter at hand. At some point thereafter, a third party may enter the room and inform the two occupants that the third party has the conference room reserved, in which case the two occupants must give up the room and locate another place to continue their meeting.

SUMMARY

The present invention provides a method and system for conference room scheduling that substantially eliminates or reduces at least some of the disadvantages and problems associated with previous methods and systems.

In accordance with a particular embodiment, a method for conference room scheduling includes detecting a user in a first location, obtaining reservation information associated with the first location, determining based on the reservation information whether the first location is reserved and notifying the user whether the first location is reserved.

Notifying the user whether the first location is reserved may comprise notifying the user via instant message, e-mail or phone call whether the first location is reserved.

If the first location is reserved, the method may include communicating to at least one participant of a meeting scheduled for the first location a request to change the location of the meeting scheduled for the first location. If the first location is not reserved, the method may include reserving the first location for the user. Reserving the first location for the user may comprise receiving from the user a termination time for the reservation of the first location. The method may include detecting that the user has left the first location and terminating the reservation of the first location after a preconfigured amount of time. The method may also include changing presence information associated with the user based on the reservation of the first location for the user.

In accordance with another embodiment, a system for conference room scheduling includes a processor operable to detect a user in a first location, obtain reservation information associated with the first location and determine based on the reservation information whether the first location is reserved. The system includes an interface coupled to the processor and operable to notify the user whether the first location is reserved.

In accordance with another embodiment, a method for conference room scheduling includes detecting a first number of users in a first meeting in a first location, obtaining capacity information associated with the first location and obtaining capacity information associated with a second location. The method also includes, based on the capacity information associated with the first location and the capacity information associated with the second location, communicating a request to at least one of the users in the first meeting in the first location to move the first meeting to the second location.

Technical advantages of particular embodiments include systems and methods that may automatically reserve room for a user detected walking into an available room. In addition, if a room into which a user walks is already reserved, conflicts may be avoided by automatically notifying the user that the room is reserved. Accordingly, situations in which users are kicked out of a room because the users did not reserve the room are reduced. In addition, particular embodiments include dynamic assignment of meeting space based on detected presence of users in the meeting space. Accordingly, meeting space may be assigned more efficiently.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION

Figure 1:
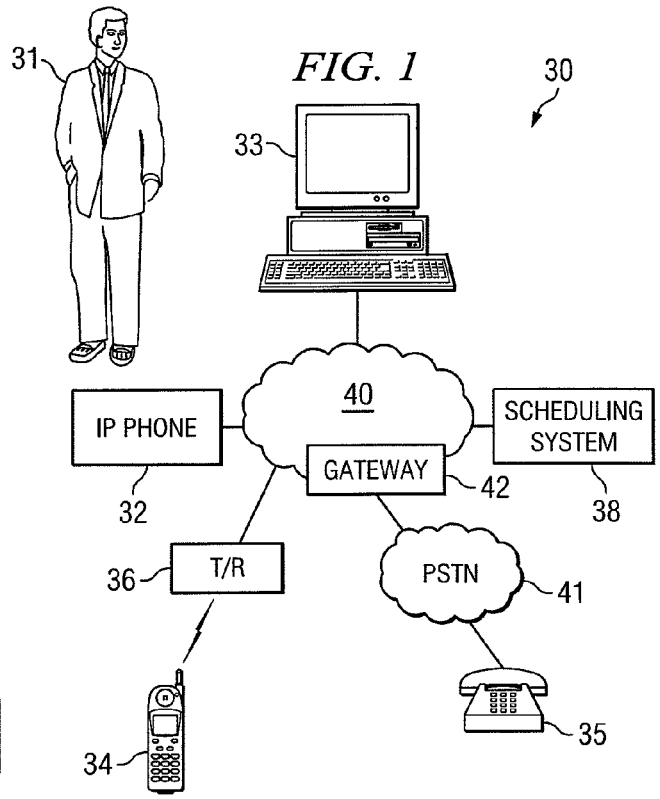
FIG. 1 illustrates a communication system with a plurality of endpoints and a scheduling system, in accordance with a particular embodiment.

FIG. 1 illustrates a communication system 30 including a plurality of endpoints 32-35 having the ability to establish communication sessions with each other and/or a scheduling system 38. Such communication sessions may be established using communication networks 40, 41 and/or additional endpoints, components or resources coupled with communication networks 40 or 41. Scheduling system 38 enables users to schedule or reserve meeting space such as conference rooms, offices and other locations for meetings. Such scheduling and reservation may be done with scheduling system 38 by users using endpoints 32-35.

In accordance with particular embodiments, systems and methods are provided that may automatically reserve room for a user detected walking into an available room. In addition, if a room into which a user walks is already reserved, conflicts may be avoided by automatically notifying the user that the room is reserved. Accordingly, situations in which users are kicked out of a room because the users did not reserve the room are reduced. In addition, particular embodiments include dynamic assignment of meeting space based on detected presence of users in the meeting space. Accordingly, meeting space may be assigned more efficiently.

Endpoints 32-35 may be any combination of hardware, software and/or encoded logic that provide communication services to a user. For example, endpoints 32-35 may include a telephone, a mobile phone, a computer running telephony software, a video monitor, a camera or any other communication hardware, software and/or encoded logic that supports the communication of media using communication network 40. In the illustrated embodiment, endpoints 32-34 include an internet protocol (IP) phone, a personal computer and wireless handset, respectively. A wireless base station transmitter/receiver 36 couples endpoint 34 with communication network 40. Endpoints 32-35 may also include unattended or automated systems, gateways, other intermediate components or other devices that can establish media sessions. Although FIG. 1 illustrates four endpoints 32-35, communication system 30 contemplates any number and arrangement of endpoints 32-35 for communicating media and participating in a conference. For example, the described technologies and techniques for establishing a communication session between or among endpoints 32-35 may be operable to establish a multipoint conference between more than two endpoints 32-35.

Although specific communication networks 40 and 41 are illustrated in FIG. 1, the term "communication network" should be interpreted as generically defining any network capable of transmitting audio and/or video telecommunications signals, data and/or messages. Communication network 40 may be any computer or communication network capable of coupling two or more endpoints 32-35, for communication. In the illustrated embodiment, communication network 40 is a wide area network (WAN) that enables communication between a plurality of endpoints distributed across multiple cities and geographic regions, and communication network 41 is a public switched telephone network (PSTN). However, communication networks 40 and/or 41 may be one or more networks, including the Internet, the public switched telephone network, local area networks (LANs), global distributed networks such as intranets, extranets or other form of wireless or wireline communication networks. Generally, communication networks 40 and 41 provide for the communication of packets, cells, frames and/or other portions of information (generally referred to as packets) between and among endpoints 32-35. Communication paths for the communication of such packets may include any combination of routers, hubs, switches, gateways (e.g., gateway 42) or other hardware, software or embedded logic implementing any number of communication protocols that allow for the exchange of packets in communication system 30.

In a particular embodiment, communication network 40 employs communication protocols that allow for the addressing or identification of endpoints 32-35 coupled to communication network 40. For example, using Internet protocol, each of the components coupled together by communication network 40 in communication system 30 may be identified in information directed using IP addresses. In this manner, communication network 40 may support any form and combination of point-to-point, multicast, unicast or other techniques for exchanging media packets among components in communication system 30.

Any given communication session between two of endpoints 32-35 may include the transfer of packets across one or more communication paths that couple endpoints 32-35 and/or scheduling system 38 across communication network 40. Such paths may include any combination of network components, gatekeepers, call managers, routers, hubs, switches, gateways, endpoints or other hardware, software or embedded logic implementing any number of communication protocols that allow for the exchange of packets in communication system 30.

Network 40 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 40 may also be coupled to non-IP telecommunication networks through the use of gateway 42. For example, network 40 is coupled to Public Switched Telephone Network (PSTN) 41. PSTN 41 includes switching stations, central offices, mobile telephone switching offices, pager switching offices, remote terminals and other related telecommunications equipment that are located across the country.

IP networks transmit data (including voice and video data) by placing the data in packets and sending each packet individually to the selected destination. Unlike a circuit-switched network (like PSTN 41), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 32-34 and scheduling system 38 are IP telephony devices. IP telephony devices have the capability of encapsulating a user's voice (or other inputs) into IP packets so that the voice can be transmitted over network 40. Similarly, IP telephony devices 32-34 have the capability of capturing and encapsulating video into IP packets so that the video can be transmitted over network 40. Conversely, IP telephony devices 32-34 have the capability of receiving audio or video IP packets from the network 40 and playing the audio or video data to a user.

A codec (coder/decoder) at the endpoint converts the voice, video or fax signals generated by the users of the telephony devices from analog media signals into digital form. The codec may be implemented either in software or as special-purpose hardware in the endpoints. In the case of an IP telephone, as the user speaks into the handset, the codec converts the analog voice signals into digital data. The digitally encoded data is then encapsulated into IP packets so that it can be transmitted over network 40. Conversely, another codec at the receiving endpoint converts the digital data into analog media for the users of the telephony devices. In the case of an IP telephone, digital data from IP encapsulated packets are received from the network 40. The codec at the receiving endpoint converts the digital voice, video or fax data from the network 40 into analog media to be played to the users of the telephony devices.

Gateway 42 may accomplish several functions, such as converting analog or digital circuit-switched data transmitted by PSTN 41 to packetized data transmitted by network 40 and vice-versa. When voice data packets are transmitted from network 40, gateway 42 retrieves the data contained in the incoming packets and converts this digital data to the analog or digital format used by the PSTN trunk to which gateway 42 is coupled. Since the digital format for voice transmissions over an IP network is often different than the format used on the digital trunks of PSTN 41, the gateway provides conversion between these different digital formats, which is referred to as transcoding. Gateway 42 also translates between the VoIP call control system and other signaling protocols (e.g., SS7, T1, ISDN, etc.), used in PSTN 41.

For voice transmissions from PSTN 41 to network 40, the process is reversed. In a particular embodiment, gateway 42 takes the incoming voice transmission (in either analog or digital form) and converts it into the digital format used by network 40. The digital data is then encapsulated into IP packets and transmitted over network 40.

Figure 2:
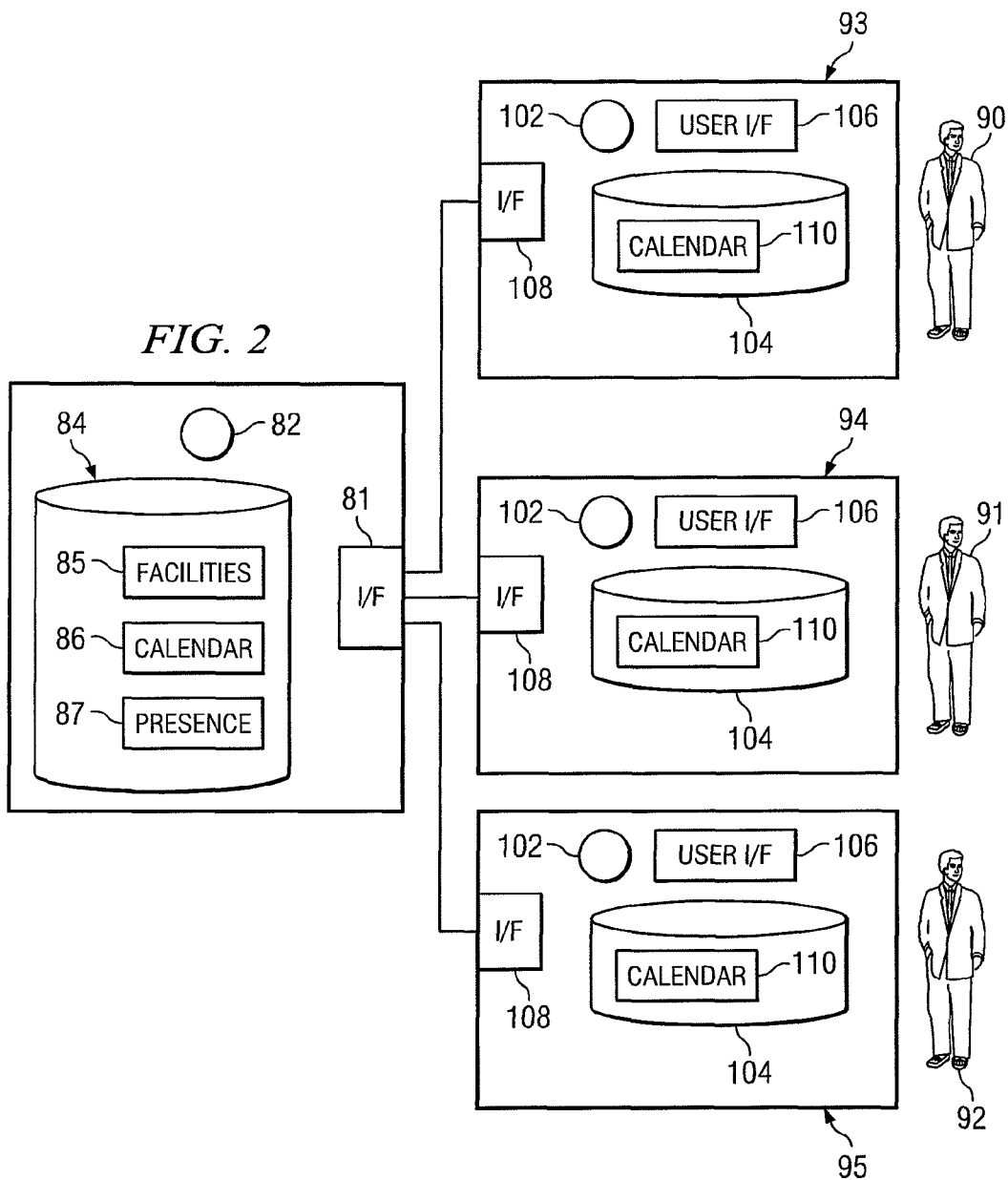
FIG. 2 illustrates a scheduling system 80, in accordance with a particular embodiment.

FIG. 2 illustrates a scheduling system 80, in accordance with a particular embodiment. Scheduling system 80 is coupled to endpoints 93-95 of users 90-92, respectively. Such coupling may be through one or more communication networks, which may include one or more WANs or LANs, such as those discussed with respect to communication system 30 of FIG. 1. Scheduling system may detect presence of a user in a room and then perform reservation functionality based on reservation information associated with the room. For example, the system may reserve the room for the user if it is not already reserved or it may notify the user that the room is already reserved if that is the case. Particular embodiments may implement additional functionality further discussed below.

Scheduling system 80 enables users to schedule or reserve meeting space such as conference rooms, offices and other locations for meetings. When a particular meeting space is reserved for a particular time with scheduling system 80, it will show up as such to users accessing the scheduling system so that they know the space is not reservable for that time. Scheduling system 80 may communicate various information, such as reminders and other communications discussed herein, to users through any suitable communication method, such as instant messaging, e-mail, SMS and phone call. Users may receive such communications through their associated endpoints (e.g., endpoints 93-95). Scheduling system 80 may operate in a similar manner to conventional scheduling systems, such as those implemented through Microsoft Outlook and Cisco MeetingPlace.

Scheduling system 80 includes a processor 82, memory 84 and interface 81. Interface 81 receives and transmits communications between scheduling system 80 and endpoints 93-95. Processor 82 may work alone or in conjunction with other scheduling system components, such as memory 84, to provide the functionality of scheduling system described herein. Processor 82 may comprise one or more microprocessors, controllers or any other suitable computing devices or resources.

Memory 84 may include any form of volatile or nonvolatile memory including, without limitation, magnetic media, optical media, random access memory (RAM), read only memory (ROM), removable media or any other suitable local or remote memory component. In the illustrated embodiment, memory 84 includes facilities memory 85, calendar 86 and presence memory 87.

Facilities memory 85 may store information related to potential meeting locations, including capacity, capabilities (e.g., audio/video capabilities) and other characteristics of meeting locations. Calendar 86 may store calendar information relevant to bookings and availability of facilities and users. Presence memory 87 may store presence information of various users and may be accessed to provide presence functionality discussed herein. Other embodiments may include similar or other memory or processor modules that work together to perform the functionality of scheduling system 80 described herein.

Scheduling system 80 may detect locations of users, for example entering particular rooms or location, using any suitable method. Such detection may be undertaken by detecting users' endpoints, such as endpoints 93-95. As mentioned, one such method may be detection through WiFi (e.g., detection of wireless computer network cards). A software referred to as Herecast currently provides this technology. Other methods of detection may include RFID or GPS technology. Current detection methods can narrow down user's location to an isolated area within a building and, in some cases, to a specific room. In some cases, scheduling system 80 may utilize presence functionality to detect that one or more particular users are in a particular location such as a meeting room.

Endpoints 93-95 may be similar to one or more of the endpoints described above with respect to FIG. 1, such as IP phone endpoint 32. In the illustrated embodiment, endpoints 93-95 each include a processor 102, memory 104, user interface 106 and a communication interface 108.

Communication interface 108 transmits and receives communications between the endpoint and other endpoints and scheduling system 80. Processor 102 may comprise one or more microprocessors, controllers or any other suitable computing devices or resources. Memory 104 may include any form of volatile or nonvolatile memory including, without limitation, magnetic media, optical media, random access memory (RAM), read only memory (ROM), removable media or any other suitable local or remote memory component. Memory 104 includes a calendar 110. Calendar 110 may include scheduling information for one or more users of the endpoint. The scheduling information may be used by scheduling system 80 to schedule a conference. In some embodiments, the scheduling system may view calendars 110 to determine whether invitees will attend a scheduled meeting so that meeting facilities may be efficiently assigned and/or reserved.

User interface 106 may include a microphone, video camera, speaker, keyboard, video display, LCD display and/or other device. Communication interface 108 may include any suitable interface for communicating with scheduling system 80 through one or more communication networks. In some embodiments, interface 108 may include a wireless network card, global positioning system (GPS) component or radio frequency identification (RFID) component to enable scheduling system 80 to detect the endpoint in accordance with functionality discussed herein.

Endpoints 93-95 may include various components such as scheduling software that work with components of scheduling system 80 to reserve meeting space such as conference rooms, offices and other locations for meetings. Such reservations may be stored in calendars of the endpoints and scheduling system 80.

As indicated above, scheduling system 80 may detect presence of a user in a room and then perform reservation functionality based on reservation information associated with the room. As an example, assume that user 90 walks into an unoccupied room, such as a conference room, with user 91. Scheduling system 80, through processor 82, detects the entrance of user 90 through, for example, a wireless network card on his laptop. Assume that the room that user 90 enters is booked through scheduling system 80. The room may be booked because, for example, another user may have reserved the room for a meeting scheduled to occur during the particular time that user 90 entered the room. In such case, scheduling system 80, through processor 82 and interface 81, may notify user 90 that the room is booked. Such notification may be made through any suitable method, such as an automatic phone call, instant message (IM) or e-mail. Since the room is unoccupied, user 90 may decide to try his luck and stay there with user 91. Alternatively, user 90 may try another unoccupied room in hopes that it is not booked.

As another option, user 90 may send an IM or other communication to one or more of users scheduled to be in the meeting in the conference room to see if they still plan on using the room (considering that it is currently unoccupied). User 90 may communicate directly with those individuals or may make this request through scheduling system 80. For example, scheduling system 80, through processor 82, may automatically open an IM window to the organizer who reserved the room.

As another example, assume that the room entered by users 90 and 91 is not booked. Scheduling system 80 may send user 90 an IM or other communication asking him if he wants to reserve the room. If user 90 responds yes, scheduling system 80 reserves the room. User 90 may also inform scheduling system 80, through any suitable communication method such as IM, of the time at which the room reservation should end. If user 90 wants to stay in the room indefinitely, he can choose not to enter a reservation end time. In this case, scheduling system 80 may detect when he leaves the room and may prompt user 90 to end his reservation. User 90 may respond yes to do so or may respond no if, for example, he plans on returning in the next few minutes. If user 90 responds no but does not return within a preconfigured amount of time (e.g., 15 minutes), scheduling system 80 may automatically end the reservation the room by user 90.

As indicated above, scheduling system 80, through for example facilities memory 85, may maintain information regarding various locations such as conference rooms, including the number and identification of users currently located in a particular room. In some embodiments, if scheduling system 80 recognizes (e.g., through location detection) that a relatively small number of users are currently occupying a large room and that a relatively larger number of users are currently occupying a small room, the system may communicate with one or more users in both rooms (e.g., such as meeting organizers of the two meetings) via IM or other communication method to ask if they would like to swap rooms. If they both agree, then scheduling system 80 may swap the two meetings with the conference rooms and notify the organizers. If there are no meeting organizers (e.g., because no meeting was officially created as in the ad hoc meeting situation discussed above), then the system may communicate with all users currently in the rooms.

Embodiments discussed herein may also be implemented with respect to more than two meetings. For example, assume that conference room A is appropriately sized for six people but currently there are ten people in the room, assume that conference room B is appropriately sized for ten people but currently there are fourteen people in the room, and assume that conference room C is appropriately sized for fourteen people but currently there are six people in the room. As indicated above, scheduling system 80 may detect and determine how many people are currently in a room or location using any suitable method. In the example given, scheduling system 80, in order to more efficiently match meetings to conference rooms according to size, may assign room A to the group currently in room C, room B to the group currently in room A, and room C to the group currently in room B. In other words, the scheduling system assigns the rooms most optimally such that as many current meetings as possible have ample space in their respective rooms.

Particular embodiments such as the one discussed above may be implemented dynamically based on the number of people in the meeting rooms at a given time, regardless of how many people were originally invited to the meetings or regardless of even how many responded affirmatively or negatively to attend the meetings. Thus, in the example above, even though only five people may have responded saying that they would attend the meeting that began in conference room A, ten people ended up attending.

In some embodiments, scheduling system 80 may leverage the information that a user has entered a conference room to change his presence information. For example, in the applications that utilize presence technology the system may change the user's state from "Available" to "In Meeting" or to some other preconfigured state that the user chooses to assign to the instances in which he is in a conference room (e.g. "Busy," "At Work," etc.).

By leveraging technology that deduces the location of a user within a building down to a conference room or other location, scheduling system 80 can take useful actions such as reserving a room for the user, more intelligently assigning rooms to meetings (i.e., groups of people) based on room capacity and size of meeting, and automatically setting the user's presence state when he begins an ad hoc meeting.

Figure 3:
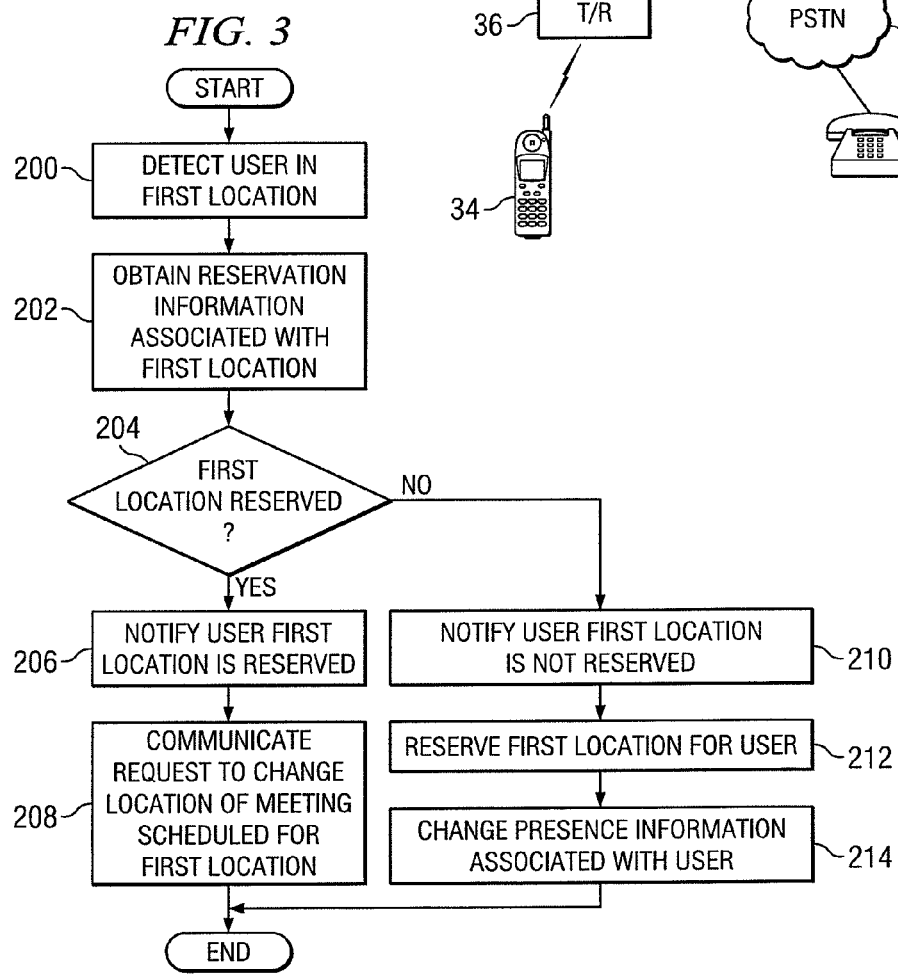
FIG. 3 is a flowchart illustrating a method for conference room scheduling, in accordance with a particular embodiment.

FIG. 3 is a flowchart illustrating a method for conference room scheduling, in accordance with a particular embodiment. The method begins at step 200 where a user is detected in a first location. The first location may comprise a potential meeting location, such as a conference room. The user may be detected through any suitable technology, such as GPS, WiFi or presence technology. In some embodiments, the user may be detected by detecting an endpoint of the user, such as the user's laptop, in the first location.

At step 202, reservation information associated with the first location is obtained. The reservation information may include current or upcoming reservations for the first location, including reservation time, reservation length, the person who made the reservation, expected attendees, list of invitees, list of those who declined a reservation for the location or any other suitable reservation information. The reservation may be obtained from a scheduling, calendar or other application. Similar applications running at user endpoints may also be used to obtain the reservation information associated with the first location.

At step 204, it is determined whether the first location is reserved. This determination may be made based on the obtained reservation information. The first location may be reserved, for example, if another user has booked the location for a meeting, whether currently or upcoming in the near future.

If it is determined that the first location is reserved, the method proceeds to step 206 where the user detected in the first location is notified that the first location is reserved. Such notification may be made, for example, through instant message, e-mail, phone call or another method of communication. Upon receiving the notification that the first location is reserved, the user may request that the other users who currently have the first location reserved be requested to change their reservation to another location. At step 208, a request to change the location of the meeting scheduled for the first location is communicated to one or more of such other users. Such communication may be made through any suitable communication method. In some cases, the request of step 208 may be automatically communicated without receive a request for the communication from the user already detected in the first location.

If it is determined at step 204 that the first location is not reserved, then at step 219 the first user may be notified through any suitable communication method that the first location is not reserved. In addition, at step 212 the first location may be reserved for the first user. This may include receiving from the user an estimated termination time for the reservation (e.g., an estimated time by which the user expects to end his meeting in the first location). In some cases, the user may be detected leaving the first location using the detection methods discussed above and, as a result, the reservation of the first location for the user may be terminated immediately or after a preconfigured amount of time. At step 214, presence information associated with the first user is changed. For example, as a result of making the reservation for the first user, the first user's presence information may be changed to "In Meeting."

Some of the steps illustrated in FIG. 3 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although particular embodiments have been described with reference to a number of elements included within a scheduling system and user endpoints, these elements may be combined, rearranged or positioned in order to accommodate particular routing architectures or needs. In addition, any of these elements may be provided as separate external components to a scheduling system where appropriate. Particular embodiments contemplate great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A computer-implemented method executable on one or more processors for conference room scheduling, comprising:
    detecting through one or more processors a first number of users present in a first meeting in progress in a first location;
    obtaining through the one or more processors capacity information associated with the first location;
    obtaining through the one or more processors capacity information associated with a second location; and
    based on the capacity information associated with the first location and the capacity information associated with the second location, communicating through the one or more processors a request to at least one of the users present in the first meeting in progress in the first location to move the first meeting to the second location;
    detecting through the one or more processors a second number of users present in a second meeting in progress in the second location;
    based on the capacity information associated with the first location and the capacity information associated with the second location, communicating through the one or more processors a request to at least one of the users present in the second meeting in progress in the second location to move the second meeting to the first location; and
    wherein the capacity information comprises a maximum number of users accommodable in a location.

2. The method of claim 1, further comprising reserving through the one or more processors the second location for the users in the first meeting.

3. A system for conference room scheduling, comprising:
    a processor operable to:
        detect a first number of users present in a first meeting in progress in a first location;
        obtain capacity information associated with the first location; and
        obtain capacity information associated with a second location; and
    an interface coupled to the processor and operable to, based on the capacity information associated with the first location and the capacity information associated with the second location, communicate a request to at least one of the users present in the first meeting in progress in the first location to move the first meeting to the second location; and
    wherein the capacity information comprises a maximum number of users accommodable in a location;
    the processor is further operable to detect a second number of users present in a second meeting in progress in the second location; and
    the interface is further operable to, based on the capacity information associated with the first location and the capacity information associated with the second location, communicate a request to at least one of the users present in the second meeting in progress in the second location to move the second meeting to the first location.

4. The system of claim 3, wherein the processor is further operable to reserve the second location for the users in the first meeting.

5. Logic embodied in a non-transitory computer readable medium, the computer readable medium comprising code operable to:
    detect a first number of users present in a first meeting in progress in a first location;
    obtain capacity information associated with the first location;
    obtain capacity information associated with a second location;
    based on the capacity information associated with the first location and the capacity information associated with the second location, communicate a request to at least one of the users present in the first meeting in progress in the first location to move the first meeting to the second location;
    detect a second number of users present in a second meeting in progress in the second location; and
    based on the capacity information associated with the first location and the capacity information associated with the second location, communicate a request to at least one of the users present in the second meeting in progress in the second location to move the second meeting to the first location; and
    wherein the capacity information comprises a maximum number of users accommodable in a location.

6. The medium of claim 5, wherein the code is further operable to reserve the second location for the users in the first meeting.

7. The method of claim 1, wherein communicating through the one or more processors a request to at least one of the users present in the first meeting in progress in the first location to move the first meeting to the second location comprises communicating through the one or more processors a request via e-mail to at least one of the users present in the first meeting in progress in the first location to move the first meeting to the second location.

8. The method of claim 1, wherein communicating through the one or more processors a request to at least one of the users present in the first meeting in progress in the first location to move the first meeting to the second location comprises communicating through the one or more processors a request via a phone call to at least one of the users present in the first meeting in progress in the first location to move the first meeting to the second location.

9. The method of claim 1, further comprising changing through the one or more processors presence information associated with one or more of the first number of users based on the move of the first meeting to the second location.

10. The system of claim 3, wherein the interface operable to communicate a request to at least one of the users present in the first meeting in progress in the first location to move the first meeting to the second location comprises an interface operable to communicate a request via e-mail to at least one of the users present in the first meeting in progress in the first location to move the first meeting to the second location.

11. The system of claim 3, wherein the interface operable to communicate a request to at least one of the users present in the first meeting in progress in the first location to move the first meeting to the second location comprises an interface operable to communicate a request via a phone call to at least one of the users present in the first meeting in progress in the first location to move the first meeting to the second location.

12. The system of claim 3, wherein the processor is further operable to change presence information associated with one or more of the first number of users based on the move of the first meeting to the second location.

13. The medium of claim 5, wherein the code operable to communicate a request to at least one of the users present in the first meeting in progress in the first location to move the first meeting to the second location comprises code operable to communicate a request via e-mail to at least one of the users present in the first meeting in progress in the first location to move the first meeting to the second location.

14. The medium of claim 5, wherein the code operable to communicate a request to at least one of the users present in the first meeting in progress in the first location to move the first meeting to the second location comprises code operable to communicate a request via a phone call to at least one of the users present in the first meeting in progress in the first location to move the first meeting to the second location.

15. The medium of claim 5, wherein the code is further operable to change presence information associated with one or more of the first number of users based on the move of the first meeting to the second location.

16. The method of claim 1, further comprising, prior to communicating through the one or more processors a request to at least one of the users present in the first meeting in progress in the first location to move the first meeting to the second location, requesting through the one or more processors confirmation from the at least one of the first number of users present in the first meeting in progress in the first location as to whether a reservation is desired.

17. The system of claim 3, wherein the interface coupled to the processor is further operable to, prior to communicating a request to at least one of the users present in the first meeting in progress in the first location to move the first meeting to the second location, request confirmation from the at least one of the first number of users present in the first meeting in progress in the first location as to whether a reservation is desired.

18. The medium of claim 5, wherein the computer readable medium comprising code is further operable to, prior to communicating a request to at least one of the users present in the first meeting in progress in the first location to move the first meeting to the second location, request confirmation from the at least one of the first number of users present in the first meeting in progress in the first location as to whether a reservation is desired.

* * * * *